Patented Aug. 17, 1948

UNITED STATES PATENT OFFICE 2,447,004

SULFO COMPOSITIONS AND THEIR METHOD OF MANUFACTURE

Bernard W. Gamson, Chicago, Ill., assignor to Great Lakes Carbon Corp., Morton Grove, Ill., a corporation of Delaware No Drawing. Application February 23, 1946, Serial No. 649,730

11 Claims. (Cl. 260—139)

This invention relates to new and useful compositions of matter and to their method of production, and is a continuation-in-part of my co-pending application Serial No. 546,427, filed July 24, 1944.

In one specific embodiment the present invention relates to the production of "sulfohydrocarbons" by the reaction of sulfur and heavy hydrocarbons under controlled conditions.

In another specific embodiment the present invention relates to the production of "sulfocarbons" by the reaction of sulfur and heavy hydrocarbons under controlled conditions.

In a further specific embodiment the present invention relates to the production of "sulfocarbons" by the conversion of said "sulfohydrocarbons" under controlled conditions.

The sulfohydrocarbons of this invention are highly amorphous, substantially homogeneous, black, infusible solids having real densities of from about 1.3 to about 1.7, comprising sulfur substantially in chemical combination with carbon and hydrogen, the products being further defined and characterized by their percentage by weight composition:

Carbon from about 47% to about 70%
Hydrogen from about 4.0% to about 1.8%
Sulfur from about 50% to about 25%
Ash negligible to about 2.5%

The foregoing defined sulfohydrocarbons are in general produced by intimately mixing and heating sulfur with suitable heavy hydrocarbons to form a reaction mixture which is liquid at a temperature of from about 300° F. to about 400–450° F., and then heating the liquid material to a temperature of from about 450° F. to about 575–625° F., to produce the solid reaction product which I have characterized as a sulfohydrocarbon.

These sulfohydrocarbons are useful for such purposes as fillers, reinforcing agents, preparation of adsorptive materials and other products and as an intermediate in the synthesis of other carbon compounds. They may also be employed in the production of sulfocarbons of the present invention, as hereinafter further described.

The sulfocarbons of the present invention are highly amorphous, hard, black, infusible solids having real densities of from about 1.5 to about 1.9, comprising sulfur in stable chemical combination with carbon and hydrogen, the products being further defined and characterized by their following percentage by weight composition:

Carbon from about 70% to about 93%
Hydrogen from about 1.8% to about 0.3%
Sulfur from about 25% to about 6%
Ash from about 0.1% to about 2.5%

The foregoing sulfocarbons are in general produced by the heat treatment or calcining of said sulfohydrocarbons in an inert atmosphere at a temperature of from about 1100° F., to about 1800° F.

These sulfocarbons are useful for such purposes as fillers, reinforcing agents and adsorbents, and as intermediates in the synthesis and manufacture of other carbon compounds such as carbon tetrachloride and carbon disulfide. The sulfocarbons especially suited for the production of carbon disulfide of high purity and in substantially quantitative yield are those containing less than about 1.3% of hydrogen and generally result at a temperature of formation of about 1200° F. to about 1600° F., and preferably at about 1400° F.

The hydrocarbons I prefer to employ in the practice of this invention, in order to obtain a maximum of the carbon in the product with a minimum formation of refractory volatile hydrocarbons, are the normally liquid or heat liquefiable heavy hydrocarbons which either boil above about 350° F., or melt below about 400° F., and more narrowly at about 100° F., to 300° F. I prefer to use such hydrocarbons so as to form a liquid mixture with sulfur at about 300° F., for the reason that such liquid state is more conducive to the intimate interaction so necessary to the formation of a homogeneous reaction product; in fact, the selected reactants are mutually miscible in the liquid state to a very high degree. While there are hydrocarbonaceous substances such as certain coals which are somewhat fusible at temperatures above about 400° F., and thus may fulfill, to some extent, the requirement for a liquid state, nevertheless I find that the thermal cracking or carbonization which occurs so readily above 400° F., competes to such an extent with the sulfurization reaction as to produce non-homogeneous products.

The hydrocarbons which I have thus far characterized as useful in the practice of this invention occur naturally or may be the products derived from the destructive distillation of coal, wood, other vegetable and animal matter; or from petroleum refining operations such as distillation, thermal cracking, acid treatment and the like. Examples of these comprise the asphalts, tars, pitches, residuums, topped crudes, acid sludge pitches and asphalts, paraffin waxes, and the like.

The foregoing considerations as to the choice of hydrocarbons which fulfill the preferred condition of a liquid state at about 300° F., are not to be construed thereby as limiting the choice of hydrocarbons to the use of a single specific heavy hydrocarbon suitable for the production of sulfohydrocarbons. Heavy hydrocarbons which fuse or melt above the range of 300° F., to 400° F., are useful to the practice of this invention for the reason that certain of these high fusing or difficultly fusible hydrocarbons, as distinguished from bituminous substances such as coal, are capable of solution in the low melting or normally liquid heavy hydrocarbons already referred to. The choice of raw materials for the production of sulfohydrocarbons, therefore, also includes mixtures of suitable substances from different sources or varying within a wide range of physical properties, the mixtures of which will satisfy the condition of a liquid state for permitting formation of intimate fluid reaction mixtures with sulfur at about 300° F. to about 400° F. Examples of substances which are useful in appropriate mixtures and fusing above 300° F. to 400° F., are air-blown asphalts, naturally occurring asphaltites such as grahamite, residues from the solvent extraction of heavy hydrocarbons, and the like.

The hydrocarbons or mixtures thereof which I employ may be further characterized as to chemical constitution and may be highly aromatic to highly paraffinic in nature, although I prefer to employ hydrocarbons whose chemical constitution is indicated by a hydrogen content of from about 4% to 10 or 12%. The highly condensed and aromatic hydrocarbons with a hydrogen content below about 4% have a fusion point above about 400° F., where the disadvantage, already described, of carbonization exists. This disadvantage, however, for certain substances apart from such as coal, may be obviated by solution as pointed out, in the normally liquid or low melting heavy hydrocarbons having a hydrogen content within the preferred range of 4% to 12% and more narrowly confined to a "solvent" hydrocarbon with hydrogen content in range of from about 6% to 10%. The highly saturated and paraffinic hydrocarbons with a hydrogen content in excess of about 12%, e. g., paraffin wax, while fulfilling the condition for a liquid state, are sufficiently refractory or so slowly reactive with sulfur as to allow considerable cracking to volatile hydrocarbons and thermal carbonization to occur resulting in a non-homogeneous sulfohydrocarbon containing less than about 50% of the total carbon of the original heavy hydrocarbon.

The following are examples of hydrocarbons, varying in degree of saturation, which may be employed advantageously in accordance with my invention although with not fully equivalent results:

TABLE I

|  | Coal Tar Fraction | Coal Tar Pitch | Petroleum Pitch | Cracked Residuum | Asphalt |
|---|---|---|---|---|---|
| Softening Point, ° F | 500 | 306 | 220 | 85 | 80 |
| Carbon_____per cent | 95.20 | 95.08 | 89.37 | 89.32 | 87.57 |
| Hydrogen_____do | 3.46 | 4.25 | 8.68 | 9.01 | 11.81 |
| Sulfur_____do | 1.24 | 0.54 | 1.74 | 1.14 | 0.46 |
| Ash_____do | 0.10 | 0.13 | 0.21 | 0.13 | 0.16 |
| Coke Residue (ASTM)_____do | 87.8 | 61.6 | 33.2 | 20.0 | 7.2 |
| Volatile (ASTM)_____do | 12.2 | 38.4 | 66.8 | 80.0 | 92.8 |

The ease of reaction of sulfur with the hydrocarbon and the degree to which the carbon is fixed in combination with sulfur is related to the hydrogen content of the hydrocarbon. I have found that the unsaturated hydrocarbons of either an olefinic or aromatic nature react very readily with sulfur between 300 and 400° F., so that a condition of unsaturation is not only important but preferable in order to secure a smoothly handled, homogeneous and substantially quantitative reaction. When a hydrocarbon containing slightly less than 12% hydrogen is reacted with a maximum proportion of sulfur at least 85% of its carbon content may be fixed in combination with sulfur; the degree to which the carbon may be fixed becomes quantitative or nearly so as the original hydrogen content decreases to about 7%, and below this value remains substantially quantitative.

The degree to which the carbon content of the hydrocarbon may be fixed in combination with sulfur is to a considerable extent additionally dependent upon the proportion of sulfur employed in the reaction. Thus the proportion of sulfur used for reaction with any of the foregoing described hydrocarbons or mixtures thereof is such as to induce a maximum fixation of the carbon with sulfur and a minimum of thermal carbon or coke, the result then is a high yield of a substantially homogeneous sulfohydrocarbon. During the reaction, the sulfurization of the hydrocarbon is accompanied by partial dehydrogenation to form hydrogen sulfide. Since the yield of product is dependent to some extent upon the hydrogen content of the organic feed, I may specify the proportions of sulfur required in terms of stoichiometric equivalence to the hydrogen, viz., sixteen parts by weight of sulfur is equivalent to each part by weight of hydrogen. I have found, however, that by employing an amount of sulfur at least about 60% of the hydrogen equivalent, at least about 85% of the original carbon may be recovered as a sulfohydrocarbon product. With increasing proportions of sulfur, say, to 110% hydrogen equivalent, conversions approaching or equal to 100% of the carbon may be obtained in the product. Higher proportions of sulfur may be used, say, to 160% hydrogen equivalent; however, there is little more to be gained by so doing. I prefer, therefore, to employ a proportion of sulfur which is substantially equivalent or slightly in excess thereof to the hydrogen content of the hydrocarbon. Any sulfur which is initially present in the hydrocarbon is calculated as a part of the total sulfur to be reacted therewith.

The hydrogen sulfide produced in the reaction represents a considerable proportion of the total sulfur used, and I prefer to recover this sulfur by suitable means for re-use in the process.

The foregoing considerations have been predicated upon the sulfurization conducted at substantially atmospheric pressure and it is apparent that the maximum fixation of carbon in union with sulfur depends only to a small extent upon pressure. I may, however, employ slightly superatmospheric pressures sufficient to suppress any tendency to volatilization of the hydrocarbon at the temperatures of operation.

A general embodiment of the method of this invention comprises mixing the hydrocarbon material with the proportioned amount of sulfur in a suitable reaction zone with good agitation to provide a reaction mixture which is liquid at a temperature of from about 300° F. to about 400° F. This liquid reaction mixture is then heated in the same or in a separate reaction zone maintained in the temperature range of from about 450° F. to 625° F., to form a solid infusible sulfohydrocarbon reaction product of low porosity. It is essential that the temperature be not above 625° F., for even at a slightly lower temperature, about 600° F., the product tends to become porous and mechanically non-homogeneous during the solidification reaction and, in consequence, the product contains internal strains conducive to mechanical disruption. It is preferable to operate at say about 575° F. maximum. The solidification to an infusible product depends upon the nature of the original hydrocarbon and the temperature employed. A finished sulfohydrocarbon product may be withdrawn directly, or, if desired, in order to remove residual uncombined free sulfur, the product may be subjected to heat soaking within the stated temperature range of solidification for additional periods of time whereby the residual free sulfur volatilizes out of the product and may be recovered for re-use.

When a sulfohydrocarbon produced as hereinbefore set forth, is heat treated in the range of temperature from about 1100° F. to 1800° F., a hard infusible composition characterized as a sulfocarbon results in which the union of sulfur with carbon and hydrogen is so stable that elemental hydrogen in contact with it at high temperature has little, if any, tendency to remove sulfur as hydrogen sulfide. In order to obtain a maximum yield of sulfocarbon it is necessary to conduct the heat treatment in an inert atmosphere and, therefore, must consist of gases and vapors which are substantially unreactive with the raw material or with the sulfocarbon produced therefrom. The inert atmosphere may consist of such substances as hydrogen sulfide, nitrogen, carbon monoxide, carbon disulfide, or mixtures thereof which may even contain low proportions of hydrogen, methane and ethane. Harmful gases are carbon dioxide, water vapor or sulfur dioxide.

The heat treatment or calcination for producing the sulfocarbons may be conducted in any suitable apparatus wherein the inert atmosphere may or may not be recirculated as desired, and in which the excess of gaseous products may be withdrawn for recovery of the sulfur from its hydrogen sulfide. The heat to such apparatus may be applied directly externally or internally, in which latter case the circulating atmosphere passes through a suitable heater in the external circuit. Since the calcination is independent of pressure, only such pressures as are needed to maintain flow are required.

A general embodiment of this step of the invention comprises introduction of the sulfohydrocarbon in heated condition from the previous step, or the previously formed solid product reheated to a temperature of about 500° F., into a calcining zone which may comprise one or more enclosed heating zones operating at intermediate temperature levels best suited to the particular rate of heating required. The end temperature of calcination is selected in the range of from about 1100° F. to 1800° F., but preferably not exceeding about 1500° F. Vaporous products are generated from the conversion of the sulfohydrocarbon to a sulfocarbon within the calcining zone. The vaporous products, at 1100° F., consist predominantly of hydrogen sulfide and of sulfur vapor and condensable hydrocarbons in relatively smaller proportions and at a more elevated temperature, say, 1500° F., relatively minor amounts of hydrogen, normally gaseous hydrocarbons and carbon disulfide appear. The conversion to sulfocarbon in the calcining zone is so rapid that a residence time of 10 minutes may be sufficient, although soaking times of about 4 hours for a 1200° F., product and about 2 hours for a 1400° F., product, and the like may be additionally employed, depending on the desired end use of the product.

A sulfohydrocarbon prepared from a cracked residuum in the manner described was ground to pass a 200 mesh Tyler screen and exhaustively solvent extracted with carbon disulfide in order to determine the amount of sulfur which had combined with carbon and hydrogen. Substantially no material other than a relatively small amount of free sulfur was soluble. The analyses before and after extraction are shown as follows:

|  | Before extraction | After extraction |
|---|---|---|
| Carbon_____percent__ | 52.5 | 56.1 |
| Hydrogen_____do____ | 2.1 | 2.0 |
| Sulfur_____do____ | 45.0 | 41.3 |
| Ash_____do____ | 0.4 | 0.6 |
|  | 100.0 | 100.0 |

The sulfohydrocarbon was subjected to X-ray diffraction analysis before and after extraction with carbon disulfide. Two wide diffuse rings were observed at 3.8 and 10 Angstroms for both samples; the first of these rings corresponds to reflections from the graphitic planes 002, and the second is characteristic of combined sulfur. Two other diffuse and faint lines occurring in the region of the graphite ring and characteristic of elemental crystalline sulfur disappeared upon extraction with carbon disulfide. However, in either case, the diffraction patterns show the sulfohydrocarbon to be highly amorphous with practically no crystalline components present except for the small amount of uncombined sulfur that was present before extraction.

In the following tabulation the source hydrocarbons, amount of sulfur and conditions which produced the sulfohydrocarbons, and the sulfocarbons resulting therefrom upon calcination are given, together with their typical percentage compositions. Analyses are shown on an ash-free basis; the ash varied between 0.2 to about 2% based on the sulfohydrocarbon.

TABLE II

*The intermediate sulfohydrocarbons*

| Run No. | Hydrocarbon | | Sulfur Per Cent used, Equivalent to Hydrogen | Finishing Temp., ° F. | Sulfohydrocarbon Per Cent Analysis (ash free) | | |
|---|---|---|---|---|---|---|---|
|  | Kind | Per Cent H |  |  | C | H | S |
| 1 | Petroleum Pitch | 8.68 | 110 | 500 | 58.9 | 2.4 | 38.7 |
| 2 | ___do___ | 8.68 | 110 | 575 | 60.0 | 2.2 | 37.8 |
| 3 | {Cracked Residuum, 75% / Coal Tar Pitch, 25%} | 9.65 / 4.25 | 100 | 460 | 46.9 | 3.1 | 50.0 |
| 4 | Same as (3) |  | 100 | 480 | 50.9 | 2.8 | 46.3 |
| 5 | Coal Tar Pitch | 4.25 | 114 | 525 | 63.7 | 1.8 | 34.5 |

*Sulfocarbons resulting from above intermediates*

[The number designations correspond]

| Run No. | Calcining Temperature ° F. | Soaking Time | Sulfocarbon Per Cent of intermediate | Per Cent Analysis (ash-free) C | Per Cent Analysis (ash-free) H | Per Cent Analysis (ash-free) S | Real Density |
|---|---|---|---|---|---|---|---|
| 1 (a) | 1,200 | 10 Min | 71.1 | 77.8 | 1.3 | 20.9 | 1.60 |
| 1 (b) | 1,400 | 10 Min | 66.0 | 83.9 | 1.0 | 15.1 | 1.69 |
| 1 (c) | 1,600 | 10 Min | 61.7 | 89.6 | 0.6 | 9.8 | 1.78 |
| 2 | 1,450 | 13 Hrs | 61.5 | 91.6 | 0.8 | 7.6 | 1.72 |
| 3 | 1,400 | 2 Hrs | 51.2 | 88.0 | 0.9 | 11.1 | 1.70 |
| 4 (a) | 1,400 | 4 Hrs | 56.5 | 86.5 | 0.9 | 12.6 | 1.70 |
| 4 (b) | 1,890 | 10 Min | 52.5 | 93.0 | 0.3 | 6.7 | 1.86 |
| 5 | 1,400 | 8 Hrs | 71.6 | 88.9 | 0.9 | 10.2 | 1.71 |

The following examples are further illustrative of my invention, but are not to be considered in limitation thereof:

EXAMPLE I

The reaction between sulfur and the various kinds of hydrocarbons shown in Table I was conducted in a single step operation in a cast iron retort immersed in a salt bath and equipped with a stirrer. Four hundred grams of the hydrocarbon were charged with amounts of sulfur ranging from 55 to 189 weight per cent of the charge, depending on the hydrocarbon and proportion of sulfur desired therewith. The reactants were charged cold and the temperature raised as rapidly as possible without losing control of the foaming due to the evolution of hydrogen sulfide produced during the sulfurization reaction. The reaction was held during about two hours in the vigorously foaming stage at about 350° F. to 400° F., until the foaming subsided and the viscosity of the sulfurized mass increased whereupon the temperature was raised to about 450° F., and the mass thickened to a plastic state, mechanical stirring was discontinued and occasional hand stirring resorted to in order to relieve swelling of the mass from the small amount of hydrogen sulfide continuing to evolve. When the stirring ceased, the finishing phase of heating for 4 to 6 hours more was begun, and solidification soon set in, whereupon the temperature was raised, in some cases, to 625° F. The finished solid product generally had shrunken away from the walls of the retort sufficiently so as to be removed in a single somewhat porous piece. The data pertinent to each run and the analyses of the products which resulted are summarized as follows in Table III:

*Analysis of sulfohydrocarbon products, per cent*

| Run No. | Carbon | Hydrogen | Sulfur | Ash [1] |
|---|---|---|---|---|
| 1 | 48.6 | 3.0 | 48.2 | 0.2 |
| 2 | 68.0 | 4.0 | 27.8 | 0.2 |
| 3 | 58.0 | 2.4 | 38.1 | 1.5 |
| 4 | 60.0 | 2.3 | 37.2 | 0.5 |
| 5 | 60.6 | 2.2 | 36.4 | 0.8 |
| 6 | 46.9 | 3.1 | 49.8 | 0.2 |
| 7 | 70.4 | 2.2 | 25.1 | 2.3 |
| 8 | 62.3 | 1.8 | 33.8 | 2.1 |

[1] Includes traces of oxygen and nitrogen. Values in excess of 0.5 are due to iron from reactor.

EXAMPLE II

A sulfohydrocarbon prepared at 500° F., from a petroleum cracked residuum containing 8.5% hydrogen and sulfur in amount 100% stoichiometrically equivalent to the hydrogen, and having the percentage composition.

| | |
|---|---|
| Carbon | 59.90 |
| Hydrogen | 2.55 |
| Sulfur | 37.40 |
| Ash | 0.15 |
| | 100.00 | was calcined for 30 minutes in a rotary kiln at 1100° F. in an inert atmosphere comprising hydrogen sulfide. A sulfocarbon, amounting to 75.3% yield, and having a real density of 1.56 was obtained having a percentage composition of,

| | |
|---|---|
| Carbon | 78.00 |
| Hydrogen | 1.52 |
| Sulfur | 20.30 |
| Ash | 0.18 |
| | 100.00 |

TABLE III

*Operating conditions and amount of carbon recovered in product*

| Run No. | Hydrocarbon, Kind | Per Cent H | Sulfur, Per Cent Basis of Hydrocarbon | Sulfur, Per Cent Equivalent to Hydrogen | Finishing Temp., °F. | Per Cent of Carbon Recovered in product |
|---|---|---|---|---|---|---|
| 1 | Asphalt | 11.81 | 189 | 100 | 500 | 93 |
| 2 | Petroleum Pitch | 8.68 | 90 | 67.6 | 500 | 90 |
| 3 | do | 8.68 | 153 | 110 | 500 | 99 |
| 4 | do | 8.68 | 153 | 110 | 575 | 98 |
| 5 | do | 8.68 | 153 | 110 | 625 | 97 |
| 6 | Crude Residuum, 75% / Coal Tar Pitch, 25% | 9.65 / 4.25 | 133 | 100 | 460 | 100 |
| 7 | Coal Tar Pitch | 4.25 | 55 | 81 | 520 | 95 |
| 8 | do | 4.25 | 77.5 | 114 | 525 | 100 |

The vaporous product amounted to 24.7% of the sulfohydrocarbon, and had the following over-all composition:

| | Per cent by weight |
|---|---|
| Hydrogen sulfide | 72.4 |
| Free sulfur | 21.2 |
| Condensable hydrocarbons | 6.4 |
| | 100.0 |

EXAMPLE III

A sulfocarbon was prepared in the manner and from the same source sulfohydrocarbon described in Example II, except that it was heat treated at the higher temperature of 1400° F. for 10 minutes. A 66.2% yield of a sulfocarbon with a real density of 1.69 was obtained having the percentage composition,

| | |
|---|---|
| Carbon | 85.80 |
| Hydrogen | 0.90 |
| Sulfur | 13.06 |
| Ash | 0.24 |
| | 100.00 |

The vaporous product amounted to 33.8% of the sulfohydrocarbon, and had the over-all composition:

| | Per cent by weight |
|---|---|
| Hydrogen sulfide | 58.5 |
| Carbon disulfide | 17.2 |
| Elemental sulfur | 15.6 |
| Condensable and gaseous hydrocarbons | 8.1 |
| Hydrogen | 0.6 |
| | 100.0 |

EXAMPLE IV

In order to determine the effect of various atmospheres during calcination of sulfohydrocarbons upon the yield of sulfocarbon, four 50 gram samples of the sulfohydrocarbon described under No. 1 in Table II were placed in a tube furnace at 1400° F. and a different gas passed over each for 2 hours with the following results,

| Run No. | Gaseous Atmosphere | Yield of Sulfocarbon, grams | Nature of Atmosphere |
|---|---|---|---|
| 1 | Carbon Monoxide | 33.3 | Inert. |
| 2 | Hydrogen Sulfide | 33.3 | Do. |
| 3 | 5% Water Vapor, 95% Nitrogen. | 30.9 | Reactive. |
| 4 | 8.5% Sulfur Dioxide, 91.5% Nitrogen. | 31.7 | Do. |

The water in No. 3 was completely reacted to carbon monoxide and carbon dioxide.
The sulfur dioxide in No. 4 gave a virtually complete reaction to form carbon dioxide.

EXAMPLE V

The sulfocarbon described in Example III was reacted with vaporous sulfur to form carbon disulfide. A one inch diameter bed of 8–14 mesh granular sulfocarbon was charged to a depth of 4 inches in a tube furnace and vaporous sulfur passed therethrough at a rate of 2 grams per minute; 65% of the sulfur was converted to carbon disulfide per pass at 1400° F. The reaction commenced at the relatively low temperature of about 1200° F., and was completed at 1400° F.; the carbon in the charge was quantitatively converted to carbon disulfide.

When a petroleum coke calcined at 1400° F. was reacted under similar conditions with vaporous sulfur, the maximum conversion of the carbon to carbon disulfide was less than 20%.

I claim as my invention:

1. As a new composition of matter, a hard, dense, amorphous, infusible, insoluble substance composed of from about 47 to about 70% by weight of carbon, from about 1.8 to 4.0% by weight of hydrogen and from about 25–50% by weight of sulfur in chemical combination, said substance being obtained by heating a uniform mixture of a heavy heat liquifiable hydrocarbon and elemental sulfur at least 60% of the stoichiometric equivalent of the hydrogen content of said hydrocarbon, to a temperature in the range of 450–625° F.

2. As a new composition of matter, a hard, dense, amorphous, infusible insoluble substance composed of about 40% to about 70% carbon, about 1.8 to 4.0% hydrogen, about 25 to 50% sulfur in chemical combination with said carbon, and about 0.1–2.5% ash, said substance having a density of about 1.3 to 1.7, and being formed by heating a uniform mixture of a heavy heat liquifiable hydrocarbon and elemental sulfur at least 60% of the stoichiometric equivalent of the hydrogen content of said hydrocarbon, to a temperature in the range of 450–625° F.

3. As a new composition of matter, a dense, hard, amorphous, infusible, insoluble substance composed essentially of about 70% to about 93% by weight of carbon, about 0.3 to about 1.8% by weight of hydrogen, and from about 6 to about 25% by weight of sulfur, said sulfur being in chemical combination with said carbon, said substance being formed by heating a uniform mixture of a heavy heat liquifiable hydrocarbon with elemental sulfur in proportions of at least 60% the stoichiometric equivalent of the hydrogen content of said hydrocarbon, to a temperature in the range of about 450–625° F. followed by heating at a temperature of about 1100° F. to about 1800° F.

4. As a new composition of matter, a dense, hard, amorphous, infusible, insoluble substance having a density of about 1.5 to about 1.9 and composed essentially of carbon in proportions of about 70% to about 93%, hydrogen of about 0.3% to about 1.8%, sulfur of about 6 to about 25%, at least a major portion of said sulfur being in chemical combination with said carbon, and about 0.1 to about 2.5% ash, said substance being formed by heating a uniform mixture of a heavy heat liquifiable hydrocarbon with elemental sulfur in proportions of at least 60% the stoichiometric equivalent of the hydrogen content of said hydrocarbon, to a temperature in the range of about 450–625° F. followed by heating at a temperature of about 1100° F. to about 1800° F.

5. A process for manufacturing a dense, hard, solid, infusible, insoluble, amorphous substance comprising of carbon, sulfur and hydrogen, the major part of said sulfur being in chemical combination, which comprises initially producing a substantially uniform mixture of a heat liquifiable heavy hydrocarbonaceous substance with elemental sulfur in proportions of at least 60% of the stoichiometric equivalent of the hydrogen content of said hydrocarbonaceous substance and heating the mixture at 450–1800° F. thereby partially dehydrogenating the hydrocarbonaceous substance by removing hydrogen in the form of hydrogen sulphide, thereby converting the mixture into a dense, hard, infusible, insoluble, amorphous substance having a density of about 1.3 to about 1.9, a carbon content of about 47 to about 93%, hydrogen of about 0.3 to about 4%, combined sulfur of about 6 to about 50%, the carbon being substantially completely convertible to carbon disulfide.

6. A process for manufacturing a solid, dense, hard, infusible, insoluble amorphous material consisting essentially of a major part of carbon and relatively minor parts of sulfur and hydrogen, which comprises initially preparing a substantially uniform mixture of a heat liquifiable hydrocarbon with elemental sulfur in proportions of at least 60% of the stoichiometric equivalent of the hydrogen content of said hydrocarbon and heating the mixture to a temperature of about 1200–1800° F. thereby eliminating a major portion of the hydrogen in said hydrocarbon as hydrogen sulfide, thereby converting the mixture into a dense, hard, infusible, insoluble amorphous substance having a density of about 1.5 to about 1.9 and composed essentially of 70–93% carbon, 0.3 to 1.8 hydrogen and 6–25% of combined sulfur, the carbon in said material being substantially completely convertible to carbon disulfide.

7. A process for manufacturing a solid, infusible, insoluble amorphous substance comprising carbon, sulfur and hydrogen, the carbon being substantially completely convertible to carbon disulfide, which comprises initially preparing a substantially uniform mixture of a hydrocarbonaceous substance liquifiable in the range of about 300–500° F. with elemental sulfur in proportions of at least 60% of the stoichiometric equivalent of the hydrogen content of said hydrocarbons, heating the mixture at about 450–625° F. thereby converting it into a solid containing at least 85% of the carbon in said hydrocarbonaceous substance, thereby producing a hard, dense, infusible, insoluble amorphous substance having a density of about 1.3 to 1.7%, carbon of about 47–70%; hydrogen of about 1.8–4%; and combined sulfur of about 25–50%.

8. A process for manufacturing a solid, infusible, insoluble amorphous substance comprising a major part of carbon with relatively minor parts of sulfur and hydrogen, the carbon being substantially completely convertible to carbon disulfide, which comprises initially producing a substantially uniform mixture of a hydrocarbonaceous substance liquifiable at about 300–500° F., with elemental sulfur in proportions of at least 60% of the stoichiometric equivalent of the hydrogen content of said hydrocarbonaceous substance, heating the mixture to about 450–625° F. thereby forming a solid, infusible, insoluble material, heating the last-named material at about 1100–1800° F. thereby eliminating the major portion of the hydrogen as hydrogen sulfide, and producing a dense, hard, infusible, insoluble, amorphous substance having a density of about 1.5 to about 1.9; carbon of about 70–93%; hydrogen of about 0.3–1.8; sulfur of about 6 to about 25%, said sulfur being combined chemically with said carbon.

9. A process for manufacturing a solid, dense, hard, infusible, insoluble, amorphous material, consisting essentially of carbon, sulfur and hydrogen which comprises initially preparing a substantially uniform mixture of a heavy hydrocarbonaceous substance having a hydrogen content of from about 4% to about 12% and being liquid in the range of about 300–500° F., with elemental sulfur in proportions of 60% to about 160% of the stoichiometric equivalent of the hydrogen content of said hydrocarbonaceous substance, and heating the mixture to a temperature in the range of about 450–1800° F., thereby partially dehydrogenating the hydrocarbonaceous substance by removing hydrogen in the form of hydrogen sulfide, thereby converting the mixture into a dense, hard, infusible, insoluble, amorphous substance having a density of about 1.3 to about 1.9, a carbon content of about 47% to about 93%, a hydrogen content of about 0.3 to about 4%, and sulfur content of about 6 to about 50%, said sulfur being combined chemically with said carbon.

10. A process for manufacturing a solid, dense, hard, infusible, insoluble, amorphous material, consisting essentially of carbon, sulfur and hydrogen which comprises initially preparing a substantially uniform mixture of a heavy hydrocarbonaceous substance having a hydrogen content of from about 4% to about 12% and being liquid in the range of about 300–500° F., with elemental sulfur in proportions of 60% to about 160% of the stoichiometric equivalent of the hydrogen content of said hydrocarbonaceous substance, and heating the mixture to a temperature of about 450–625° F., thereby partially dehydrogenating the hydrocarbonaceous substance by removing hydrogen in the form of hydrogen sulfide, thereby converting the mixture into a dense, hard, infusible, insoluble, amorphous substance having a density of about 1.3 to about 1.7, a carbon content of about 47% to about 70%, a hydrogen content of about 1.8 to about 4%, and sulfur content of about 25 to about 50%, said sulfur being combined chemically with said carbon.

11. A process for manufacturing a solid, dense, hard, infusible, insoluble, amorphous material, consisting essentially of a major part of carbon and relatively minor parts of sulfur and hydrogen which comprises initially preparing a substantially uniform mixture of a hydrocarbonaceous substance having a hydrogen content of from about 4% to about 12% and being liquid in the range of about 300–500° F., with elemental sulfur in proportions of 60% to about 160% of the stoichiometric equivalent of the hydrogen content of said hydrocarbonaceous substance, and heating the mixture to a temperature of about 1200–1800° F., thereby eliminating a major portion of the hydrogen from the hydrocarbonaceous substance as hydrogen sulfide, thereby converting the mixture into a dense, hard, infusible, insoluble, amorphous substance having a density of about 1.5 to about 1.9, a carbon content of about 70% to about 93%, a hydrogen content of about 0.3 to about 1.8%, and sulfur content of about 6 to about 25%, said sulfur being combined chemically with said carbon.

BERNARD WM. GAMSON.

REFERENCES CITED

The following references are of record in the file of this patent:

UNITED STATES PATENTS

| Number | Name | Date |
|---|---|---|
| 480,235 | Dubbs | Aug. 2, 1892 |
| 898,378 | Kohler | Sept. 8, 1908 |
| 1,896,227 | Egloff | Feb. 7, 1933 |
| 2,109,692 | Forney | Mar. 1, 1938 |
| 2,147,578 | Hendrey | Feb. 14, 1939 |
| 2,178,325 | Kobbe | Oct. 31, 1939 |
| 2,210,877 | Bray | Aug. 13, 1940 |
| 2,309,692 | Chittick | Feb. 2, 1943 |
| 2,312,750 | Cohen | Mar. 2, 1943 |
| 2,330,934 | Thacker | Oct. 5, 1943 |
| 2,380,466 | Reiff et al. | July 31, 1945 |